P. CATUCCI.
THROW-OFF MECHANISM FOR FISHING REELS.
APPLICATION FILED FEB. 26, 1914.
1,135,497.
Patented Apr. 13, 1915.
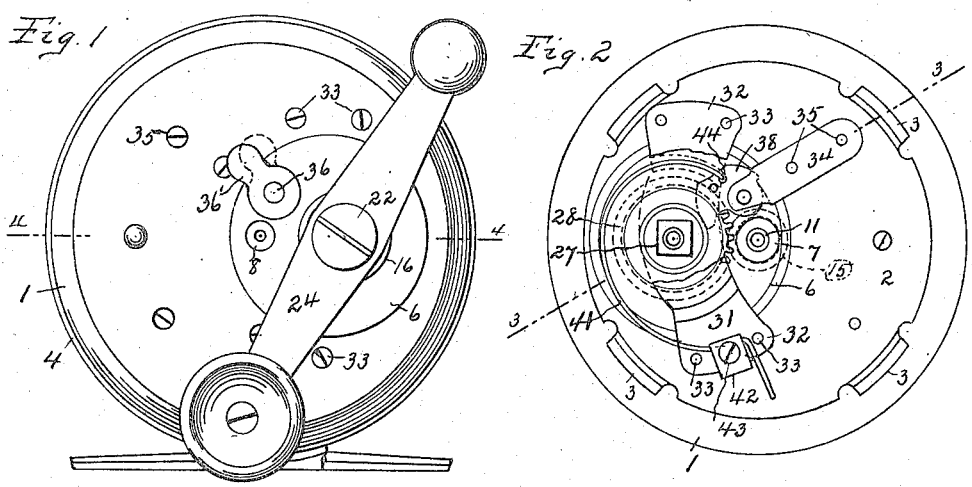
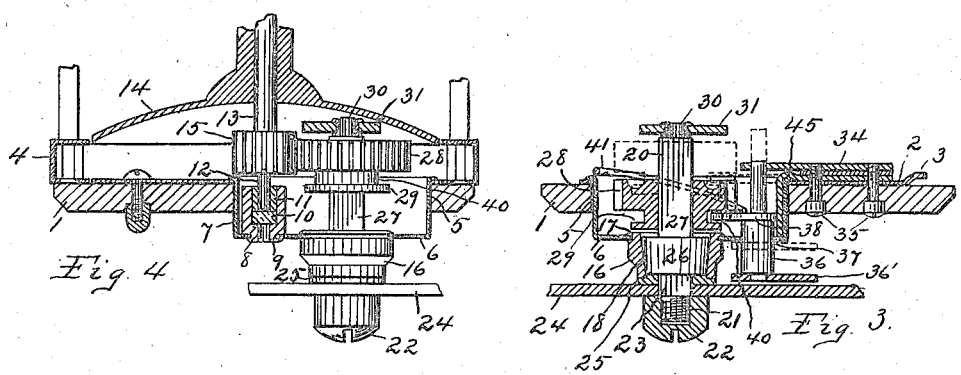
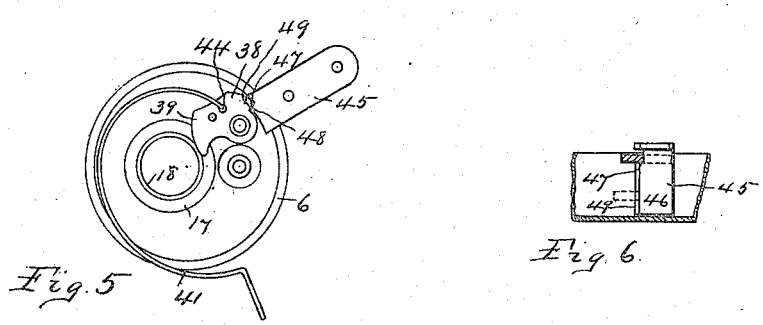
WITNESSES:
Pliny Catucci INVENTOR
BY Louis M. Sanders
ATTORNEY

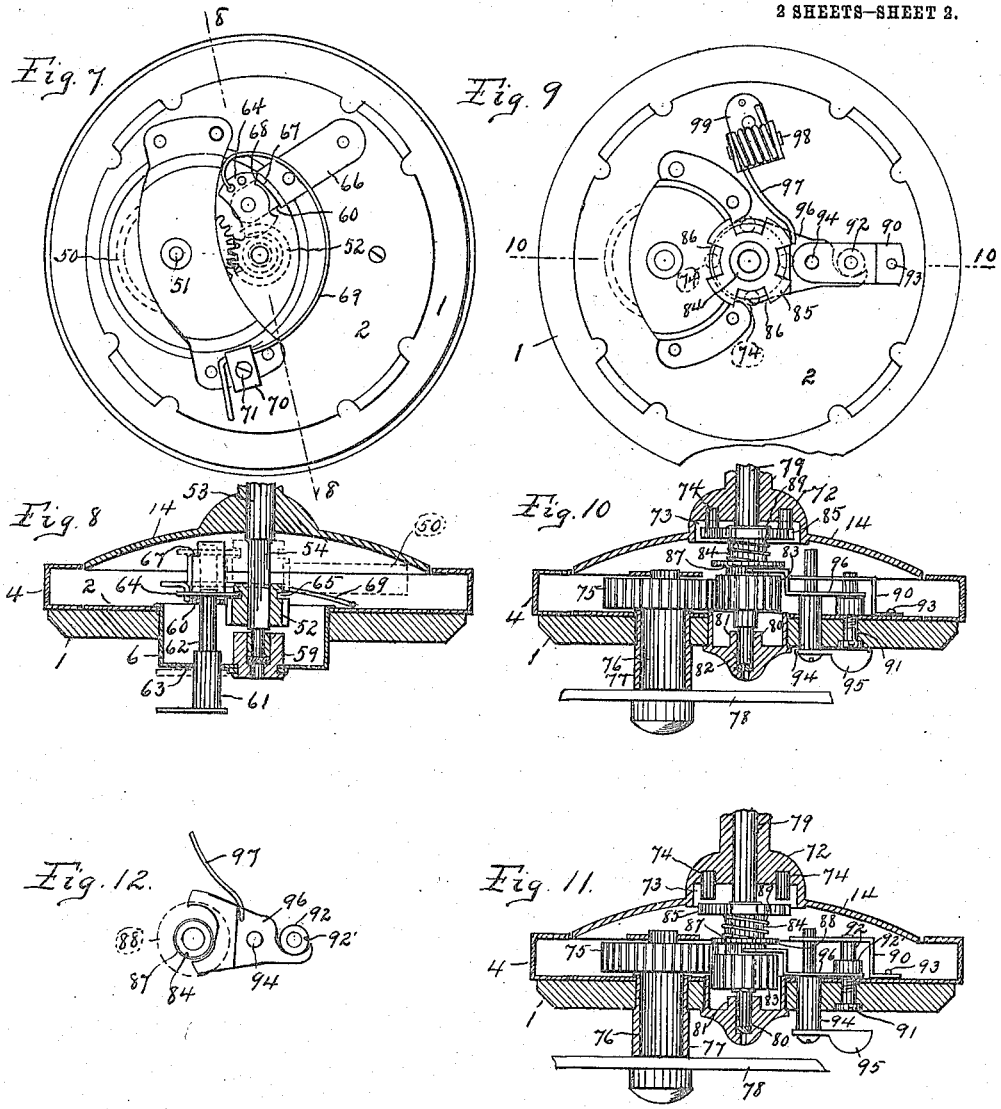

UNITED STATES PATENT OFFICE.

PLINY CATUCCI, OF NEWARK, NEW JERSEY, ASSIGNOR TO A. F. MEISSELBACH & BROTHER, A CORPORATION OF NEW JERSEY.

THROW-OFF MECHANISM FOR FISHING-REELS.

1,135,497.  Specification of Letters Patent.  Patented Apr. 13, 1915.

Application filed February 26, 1914. Serial No. 821,179.

*To all whom it may concern:*

Be it known that I, PLINY CATUCCI, a citizen of the United States, residing in the city of Newark, county of Essex, and State of New Jersey, have invented certain new and useful Improvements in a Throw-Off Mechanism for Fishing-Reels, of which the following is a full, clear, and exact description, such as will enable others skilled in the art to make and use the same.

My invention relates to that class of fishing reels known in the art as free spool reels, wherein mechanism is provided for disconnecting the spool from the winding mechanism so that the spool itself may revolve freely without hindrance from the winding crank or lever and the intervening train of gears. In spools of this character, it is common to apply a brake or drag upon one end of the reel frame whereby the rotation of the spool may be more or less retarded, and mechanism is usually provided for increasing or decreasing the amount of this drag. This, however, is designed for utilization in playing a fish, and is a common feature in many of the reels now on the market and also which have been the subject matter of my own prior patents. The present invention, however, relates to mechanism for shifting one of the gears of the driving train into or out of engagement with another gear of the train so that with the aforesaid drags out of operation, and with the gears properly thrown the spool is free to rotate upon its pivots. This is an object much to be desired in what is known as bait casting, in which the fisherman, after paying out a few feet of the line from the end of his fishing rod, gives the same, with the sinker attached to the end thereof, a whirl through the air and immediately frees the spool so that the line with its bait and sinker may be cast to as great a distance from the fisherman as possible, or as he may desire. Any retardation of the spool will correspondingly lessen the distance of the cast, therefore it is essential that no unnecessary friction should come against the rotating parts of the spool.

In modern fishing reels, it is common to provide a train of two or more gears, the power being applied to the train by means of an external crank or lever so that through the use of gears the spool itself is made to revolve two, three or more times as fast as the crank or lever is revolved.

In carrying out my invention, the principles involved therein may be embodied in three separate combinations of elements. First, the large gear may be splined to its shaft so that it may be shifted longitudinally of such shaft into and out of engagement with the spindle pinion. Second, the spindle pinion may be splined to the spindle so that it may be shifted longitudinally of said spindle into and out of engagement with the driving gear. Third, the driving gear and the spindle pinion may be held in constant engagement, and clutch mechanism may be utilized upon the spool spindle for engaging its pinion with, and disengaging it from the spindle itself. Each of these several embodiments of the principles of my invention will be fully disclosed in the following specification taken in connection with the accompanying drawings, wherein:

Figure 1, is an end view of the head plate of a reel frame. Fig. 2, is an inside plan view of the head plate removed, showing the gear train and gear shifting mechanism. Fig. 3, is a section on line 3—3 of Fig. 2. Fig. 4, is a section on line 4—4 of Fig. 1. Fig. 5, is a plan view of the gear shifting element. Fig. 6, is a front elevation of the stop mechanism for the gear shifting element. Fig. 7, is a view similar to Fig. 2. Fig. 8, is a view similar to Fig. 3, of the second form which my invention may take. Fig. 9, is a plan view of the preferred form of my invention. Fig. 10, is a section on line 10—10 of Fig. 9, showing the spool clutch member in engagement with the pinion clutch member whereby the spool is driven by the rotation of the crank or lever. Fig. 11, is a similar sectional view showing the clutch members disengaged. Fig. 12, is a detailed plan view of the shifting member.

In Figs. 1 to 6, I have shown the first of the forms of the embodiment of my invention as above described. In this case I have shown the head plate 1, as provided with a substantially circular metallic plate 2, secured to the inner face thereof by means of a series of screws which are also utilized for holding other parts of the mechanism in place, and which will be described in detail as they are taken up. The plate 2, is provided with a plurality of offset projections 3, by means of which the head plate is secured to the head ring 4, of the reel frame.

It should be understood at this point, that I have only shown in the several figures, so much of a reel frame as is necessary to gather a full understanding of the operation of my invention. The reel frame may be of any usual or preferred type; the one shown for illustration being that particularly described in my prior Patent #1,027,179. The fastening mechanism by which the head plate is secured to the head ring is substantially the same, the head plate being provided with a plurality of the projections 3, to correspond with notches in the head ring so that the head plate with such projections inserted in said notches may be given a slight turn to bring the projections 3, against the inner solid portion of the flange of the head plate; thus the head plate is firmly secured to the head ring 4. In the present case, the head plate 1, may be made of any suitable material, as for example, vulcanized rubber. Eccentrically located in said head plate 1, and the metallic plate 2, is an aperture 5, into which is firmly secured a cylindrical cup-shaped member 6. At one side of this cup-shaped member, and in the exact center of the head plate 1, is secured the spindle bearing 7, which is of general tubular shape and secured into position by spinning the projection 8, over the edge of the aperture 9, in the bottom of the cup 6. Within the bearing 7, is located the sapphire thrust bearing 10, resting against the interior shoulder thereof. In order to hold the thrust bearing 10 in place, I insert within the bearing 7, a sleeve 11, forcing the same in place against the outer surface of the sapphire bearing 10. This forms a firm and rigid bearing for the spool spindle pivot 12. The spool spindle 13, carries the spool 14, in the usual manner and rigidly connected therewith is also the spindle pinion 15; the opposite end of the spindle being, as will be understood, supported by the other head plate of the reel, which is not shown. Also secured in the bottom of the cup 6, is the bearing sleeve 16, held in place by spinning over the projecting end of the reduced shoulder 17, as clearly shown in Fig. 3. The bearing sleeve 16, is provided with an internal cone bearing 18. Mounted in said bearing is the driving shaft 20, provided with the screw-threaded end 21, to receive the holding nut 22. Next to the threaded end of the driving shaft is the square portion 23, which receives the squared aperture of the crank lever 24, by which the driving shaft is rotated. Beneath the flat portion of the driving lever 24, is a washer 25. With the parts thus far described assembled, the lever 24, is firmly secured to the driving shaft and the enlarged cone 26, bearing as it does on the cone bearing 18, of the bearing sleeve 16, the parts are held against disengagement. The extension of the driving shaft is squared as at 27, to receive the squared aperture of the driving gear 28. It will be noted that the squared portion 27, of the driving shaft is considerably longer than the thickness of the driving gear 28, so the gear may slide longitudinally on said shaft. The driving gear 28, is provided with a grooved collar 29, to receive the gear shifting mechanism hereinafter to be described. The pivot end 30, of the driving shaft is received by the bridge 31, the legs 32 of which are secured to the head plate by means of the screws 33, which are screwed from the outside of the head plate through the body thereof and through the plate 2, and finally threaded into the legs 32. These screws 33, serve to hold the head plate 1, and the metallic disk 2, together. Slightly to one side of the center of the head plate and disk 2, is located a bearing bracket 34, held in place by means of the screws 35, which also pass from the outside of the head plate 1, and through the metallic disk 2, and are screwed into said bearing bracket 34. The inner end of this bearing bracket 34, projects over the end of the edge of the cup 6, and forms one of the bearings of the sliding and gear shifting shaft 36; the other bearing for said shaft, being formed by the aperture 37, in the bottom of the cup 6. In Fig. 3, I have shown the two positions occupied by this sliding oscillating shaft, that shown in full lines indicating the position occupied when the driving gear 28, and the spool pinion 13, are disconnected, and in dotted lines, when they are in engagement.

Rigidly mounted upon the shaft 36, is the cam shaped shifting member 38, the shape of which is clearly indicated in Fig. 5. This shifting member has the segmental arm 39, extending into the groove 40, formed between the collar 29 and the body of the driving gear 28, but normally out of contact with the lines of such groove.

Inasmuch as the shaft 36, is longitudinally slidable in the direction of its axis, it will be readily seen that by pushing the same in or out, the gear shifting member 38, will carry with it the driving gear 28, but such shifting member must be provided with mechanism which will not permit it to remain in any intermediate position; that is, it must be wholly in or wholly out. This is accomplished by the spring 41, which is not only a compression spring but a torsion spring. Its contour is clearly shown in Fig. 2. One end of it is secured beneath the clamping knee 42, which is held in place by means of a screw 43, screwed into the foot 32, of the bridge 31. The free end of the spring 41, is bent back so as to bear upon the face of the disk 2. The spring 41, after it leaves the knee 32, curves around outside of the cup 6, and around the gear 28, within said cup, and has its opposite end bent at right angles to its general plane and inserted into an aperture 44, in the edge of the shifting member 38. This spring 41, is so constructed that it has a tendency to swing the shifting member 38, together with the shaft 36, about its axis in the direction of the hands of a clock, as looking upon Fig. 2. It also has the tendency to shift the shaft 36, into the position shown in full lines in Fig. 3, so that when the operating lever 36' of the shaft 36, is depressed into the dotted line position in Fig. 3, such depression takes place against the pressure of the spring 41.

In order to hold the shaft 36, in the dotted line position with the driving gear 28 in engagement with the pinion 15, I provide the following mechanism. Underneath the bearing bracket 34, is located the L shaped member 45, the angular end 46, of which extends down into the cup 6. Just at the bend of said angular member 46, I provide a notch or shoulder 47. The gear shifting member 38, is provided with a shoulder 48, which when the shaft 36, is in the full line position, as shown in Fig. 3, rests against the edge 49, of the L shaped member 45, and during the depression of the shaft 36, against the opposition of the spring 41, this shoulder 48, rides against the edge 49, of said member 45. However, when the shoulder 48, reaches a point in its travel above the shoulder 47, the tendency of the spring 41, is to rotate the shaft 36 and with it the gear shifting member 38, so that the shoulder 48, will snap over the shoulder 47. Thus the shaft 36, is locked in position with the driving gear 28, in the dotted line position shown in Fig. 3, and also in full line position in Fig. 4. If now, it is desired to free the gears 15 and 28, from engagement with each other, it is only necessary to turn the arm 36' slightly so as to free the shoulder 48, from the shoulder 47, whereupon the spring 41, will act to throw the shaft 36, into the full line position shown in Fig. 3, and with it the driving gear 28. Thus the driving gear 28, is entirely free from engagement with the pinion 15 and the spool 14, is free to rotate without hindrance from the driving gear.

In the second form of my invention, shown in Figs. 7 and 8, the head plate 1, securing disk 2, head ring 4, spool 14, and corresponding parts are substantially the same as hitherto described in connection with the first figures. The principal difference resides in rigidly securing the driving gear 50 upon the driving shaft 51, in a position completely above the head plate as shown in Fig. 8, and making the spindle pinion 52, slidable upon the spindle 53, squaring said spindle at 54, as clearly shown in Fig. 8. In this case, the spindle pivot bearing 59, is somewhat shorter than that hitherto described in the other form, so that the pinion 52, may slide down into the cup 6, so as to be free from the driving gear 50, the location of which is shown in dotted lines in Fig. 8. The means for shifting the pinion 52, upon the squared spindle 54, is substantially the same as that described in connection with the first form of my invention. The supporting bracket 60, is secured to the disk 2, in the same manner with its overhanging bearing extending across the rim of the cup 6. The sliding oscillating shaft 61, has its reduced portion 62, extending through the overhanging end of the bracket 60, while the larger body of the shaft 61, slides in an aperture 63, provided therefor in the bottom of the cup. The gear shifting element 64, is rigidly secured upon the upper end of the reduced shaft 62, and has its overhanging arc shaped arm located in the groove 65, provided therefor on the hub of the pinion 52. The guiding stop 66, is located above the bracket 60, and has its L shaped arm extending above the disk 2, instead of into the cup 6, as hitherto described. The L shaped arm is provided with a notch 67, at its upper end so that the shoulder 68, of the shifting element 64, may swing thereover and lock itself in position when the shaft 61, is pushed into the dotted line position shown in Fig. 8. The swinging of such element is caused by means of the double action spring 69, in substantially the same manner as that hitherto described in connection with the first named structure. The spring 69, is held in position under the knee 70, by means of the screw 71. The tail of the spring is extended and rests upon the face of the disk 2.

The operation of the structure is substantially the same as that hitherto described in connection with the first form, when the sliding oscillating shaft 61, is pushed in against the pressure of the spring 69. The torsion effect of such spring will swing the shoulder 68, upon the stop shoulder 67, and thus lock the element in position with the pinion 52, in engagement with the driving gear 50. However, when the shaft 61, is given the slight turn against the spring 69, the shoulder 68, will be released from the stop shoulder 67, when the compression effect of the spring 69, will drive the sliding shaft 61, into the full line position shown in Fig. 8, while the shifting element 64, will carry with it the pinion 52, out of engagement with the driving gear 50, whereupon the spindle is entirely free from the driving mechanism. The slight friction of the arc shaped part of the shifting element 64, which engages the groove 65, of the pinion 52, is insufficient to materially retard the free rotation of the spindle 53, and the spool 14.

In the third form of my invention, the general features and dimensions are preserved throughout, and the means for fastening the head ring 4, to the head plate 1, are the same. The head 72, of the spool 14, however, is provided with a cylindrical cavity 73, from the bottom of which project a series of studs 74. The driving gear 75, is provided with a long journal 76, which extends through a sleeve 77, mounted in the head plate 1, and the journal 76, has secured at its outer end, the usual driving crank or lever 78. The spool spindle 79, is rigidly secured in the spool head as usual, and its pivot 80, is carried by a pivot bearing 81, the latter being in the form illustrated in Fig. 10. It consists of a cup-shaped member rigidly secured in the center of the head plate 1, and is provided with a central pivot bearing 82. The spindle 79, is cylindrical throughout, and has slidably mounted upon it, the pinion 83, the latter being provided with an extended hub 84, upon the outer end of which is rigidly secured the clutch member 85, of the general contour and form shown in Fig. 9. The notches 86, of this clutch member are designed to receive the studs 74, in the hub 72 of the spool. The hub 84, of the pinion 83, is provided with a shoulder 87, slightly spaced away from the upper face of the pinion 83. Mounted upon the hub 84, is the loose collar 88, held against said shoulder by the coiled spring 89, which surrounds the smaller diameter of the hub 84, and bears against the under side of the clutch member 85. The spring 89, thus serves to hold the collar 88, with a yielding pressure against the shoulder 87, and spaced away from the face of the pinion 83.

Rigidly secured to the head plate 1, and the disk 2, as indicated in Figs. 9 and 10, is the Z shaped bearing bracket 90, the means for securing said bracket being the screw 91 passing from the outside of the head plate 1, into a stud 92, which in turn is riveted or otherwise rigidly secured to the free arm of the bracket 90. I also provide a positioning dowel 93, for holding the bracket 90 in place.

Extending through the head plate 1, the disk 2, and the free end of the bearing bracket 90, is the sliding, oscillating shaft 94, provided at its outer end with the operating arm 95. This sliding shaft 94, has its diameter reduced where it passes through the bearing bracket 90, the latter serving as a guide for the reduced diameter of such shaft. Rigidly secured upon the sliding, oscillating shaft 94, as indicated in Fig. 10, is the shifting member 96, the latter being generally Z shaped in longitudinal section and of the general contour illustrated in Fig. 12. The forward end of this shifting element is forked as shown, and the forked end surrounds the hub 84, of the pinion 83, between the loose collar 88, and the face of the pinion 83. The tail of the shifting member 96, is cut away as shown, and is designed to bear upon the cylindrical surface of the stud 92, either upon its large diameter, or above the shoulder 92' thereof, against its smaller diameter. The forked end of the shifting member 96, has its arms sufficiently widely spaced to permit of the slight oscillation of the member 96, with the shaft 94, about its axis, without being in any measure interfered with by the hub 84. Thus it will be seen that the shaft 94, may be pushed into the position indicated in Fig. 10, with the tail of said shifting element riding above the shoulder of the stud 92, or said sliding shaft 94, may be withdrawn into the position shown in Fig. 11, carrying with it the shifting member 96, which in turn will throw the pinion 83, and the clutch member 85, into the position shown with such clutch member 85, entirely free from the clutch studs 74. The means for throwing these elements into such positions resides in the spring 97, which is coiled about a shaft 98, carried by a bracket 99, the latter being rigidly secured to the disk 2, in the position shown. The long end of the spring 97, extends forward into a position to bear upon the lower horizontal arm of the shifting member 96, just at the angle of the upward bend of said member. The opposite end of the spring bears upon the face of the bracket 99, and such spring is under considerable tension so that its tendency is to depress the shifting member 96, toward the face of the disk 2, whenever such action is permitted by the freeing of the tail of the shifting member 96 from the shoulder 92', of the stud 92. The long arm of the spring 97, bearing as it does against the vertical element of the shifting member 96, also has a tendency to turn said member 96, with the shaft 94, around the axis of said shaft. This turning tendency causes the curved tail of the shifting member 96, to bear with considerable force against the cylindrical stud 92, either against its large diameter, or above the shoulder against its small diameter, but the depressing tendency of the spring is sufficient whenever the tail of said shifting member is pressed free from the shoulder stud 92, to force said shifting member with its shaft 94, into the position shown in Fig. 11, carrying with it, the pinion 83, and the clutch member 85, together with the connecting parts.

As above indicated, the means for freeing the tail of the shifting member 96, from the shoulder of the stud 92, is the arm or crank 95, rigidly secured to the outer end of the shaft 94. Thus whenever the arm 95, is turned so as to carry the tail of the member 96, away from the shoulder of the stud 92, the spring 97, will depress the shaft and thus separate the clutch mechanism heretofore described, from the spool, whereby the spool and its spindle 79, are free to rotate independent of the pinion 83. When, however, it is desired to reëngage the driving mechanism with the spool, it is only necessary to press the head of the shaft 94, inwardly toward the face of the head plate 1, and against the opposition of the spring 97, until the tail of the shifting member 96, snaps over the shoulder of the stud 92. If, when the shaft 94, is depressed the lobes of the clutch member 85, should be in position to interfere with the outer ends of the clutch studs 74, no harm will result, for the forked end of the shifting member 96, will simply depress the loose collar 88, against the spring 89, and the parts will remain in such position until the spool with its studs 74, have adjusted themselves and the studs 74, snap into the notches 86, of the clutch member 85, then of course, the spool and the driving mechanism will be engaged and ready for operation.

From the above description, it will be seen that the underlying principle of my invention resides in the sliding, oscillating shaft with its shifting member rigidly mounted thereon, taken in conjunction with a double acting spring which has a normal bias to throw the sliding, oscillating shaft in its outermost position, leaving the spool free to rotate independently of the driving train of gears. This spring also has a second normal bias which is utilized to rotate the sliding, oscillating shaft with the shifting member in locked position, whereby either the gears themselves are locked in engagement with each other, or the clutch members in the third form of my invention are locked in engagement with each other. In other words, there is no intermediate normal position which the shifting member can occupy, it must be wholly in or wholly out of position for operation of the spool. This is a valuable feature in fishing reels of the type in which my invention belongs.

In my prior Patent #929867, I have shown a very successful automatic free spool reel, that is to say, the spool is controlled by the action of the handle. For example, to recover the line it is only necessary to turn the handle, the turning of which automatically engages the clutch mechanism with the spool head. When the handle is released or turned back, the spool is free to revolve and thus pay out the line. In practice, this form of free spool mechanism has proven very successful with small reels used for catching small fish, but it is found troublesome in fighting large, struggling fish. When such a fish is caught, it is almost impossible for the angler to have absolute control of the handle. It often happens that he releases the handle for an instant, or it is turned the wrong way. In an automatic reel this release of the handle means the freeing of the spool. At this point the much excited angler sees the fish running away and when he turns the handle again, the sudden engagement of the mechanism is a great shock to the reel as well as to the much disturbed fisherman, who thinks for a moment that the reel may fail him. In my present invention, I have provided a sure means for controlling the throw-off mechanism in which, as hitherto set forth, there is no intermediate position. The engagement is snapped in and snapped out. The angler may touch the controlling knob but the completeness of the movement both ways is automatic and positive. The line spool can not be engaged or disengaged when it is not desired by the angler.

It will thus be seen that I have accomplished the objects of my invention by structures which are at once simple and easy of manipulation, and that the structures are such as to require little care and are not liable to disarrangement.

I claim:

1. In a throw-off mechanism for fishing reels, the combination of a spool, a train of gears for rotating said spool, means for locking said gear train in engagement with said spool, and manually released spring mechanism for unlocking said means and for disengaging said train of gears from said spool.

2. In a throw-off mechanism for fishing reels, the combination of a line spool, a train of gears for rotating said spool, means for engaging and disengaging said spool from said train of gears, comprising a spring actuated oscillating reciprocating shaft, and manually operated means for oscillating said shaft to effect said disengagement and for reciprocating said shaft to effect said disengagement.

3. In a throw-off mechanism for fishing reels, the combination of a line spool, and a manually driven train of gears for rotating said spool, means for retaining the engagement of said spool and train of gears, comprising a spring pressed reciprocating shaft, means for manually depressing said shaft to effect said engagement, and automatic locking mechanism for locking said shaft against a reverse reciprocation.

4. In a throw-off mechanism for fishing reels, the combination of a line spool, and a manually driven train of gears in normal engagement with said spool for rotating the same, a shaft mounted for limited oscillation upon, and for limited reciprocation in the direction of its axis, a double acting spring connected with said shaft for yieldingly holding the same against oscillation in one direction, and against reciprocation in one direction, and means connecting said shaft with an element of said gear train for engaging the same with and disengaging the same from said spool.

5. In a throw-off mechanism for fishing reels, the combination of a line spool, and a manually driven gear train in normal engagement with said spool to rotate the same, a shaft mounted for limited oscillation upon and reciprocation in the direction of, its axis, an arm upon said shaft engaging an element of said gear train whereby the reciprocation of said shaft in one direction will effect a locked engagement and an oscillation of said shaft will effect a disengagement of said gear train and spool.

6. In a throw-off mechanism for fishing reels, the combination of a line spool, and a manually driven train of gears in normal engagement with said spool to rotate the same, a shaft mounted for limited reciprocation in the direction of its axis, a spring for giving said shaft a normal bias in one direction, means for locking said shaft against the bias of said spring, and a connection between said shaft and an element of said gear train whereby upon the release of said locking means said spring will reciprocate said shaft and cause said connection to disengage said gear train from said spool.

7. In a throw-off mechanism for fishing reels, the combination of a line spool, and a manually driven gear train in normal engagement with said spool to rotate the same, a shaft mounted for limited reciprocation in the direction of its axis, a spring for giving said shaft in normal bias in one direction, a connection between said shaft and an element of said gear train whereby the reciprocation of said shaft in one direction will cause said connection to disengage said gear train from said spool, and a reciprocation in the opposite direction will cause a reëngagement of said gear train with said spool.

8. In a throw-off mechanism for fishing reels, the combination of a line spool, and a manually driven gear train in normal engagement with said spool to rotate the same, a shaft mounted for limited reciprocation in the direction of its axis, a connection between said shaft, and an element of said gear train whereby the reciprocation of said shaft in one direction will cause the disengagement of said gear train with said spool, and a reciprocation in the opposite direction will cause a reëngagement of said gear train with said spool, and means for locking said connection to retain the normal engagement of said gear train with said spool.

9. In a throw-off mechanism for fishing reels, the combination of a line spool, and a manually driven gear train in normal engagement with said spool to rotate the same, a shaft mounted for limited reciprocation in the direction of and oscillation upon its axis, a spring for sliding said shaft in one direction, and for oscillating the same in one direction, and manually operated means for moving said shaft in the opposite directions against the dual action of said spring, and a shifting element upon said shaft for engaging an element of said gear train for engaging and disengaging the same from said spool.

10. In a throw-off mechanism for fishing reels, the combination of a line spool, and a manually driven gear train in normal engagement with said spool to rotate the same, a shaft mounted for limited reciprocation in the direction of its axis and for limited oscillation about its axis, a spring for giving said shaft a normal bias in the line of its axis in one direction, and about its axis in one direction, manually operated means for oscillating said shaft in one direction against the bias of said spring and for reciprocating said shaft against the bias of said spring, a connection between said shaft and an element of said gear train whereby the reciprocation of said shaft against the bias of said spring will engage said gear train with said spool, and a reciprocation of the shaft in the opposite direction will disengage said gear train from said spool, and means for permitting the oscillation of said shaft about its axis to lock the same against reciprocation in either direction.

11. In a throw-off mechanism for fishing reels, the combination of a line spool, and a manually driven gear train in normal engagement with said spool to rotate the same, a shaft mounted for limited reciprocation in the direction of its axis and for limited oscillation about its axis, a shifting member rigidly connected to said shaft, means for locking said shaft against oscillation at one end of its throw and against reciprocation at the opposite end of its throw, and means whereby said shifting member may engage an element of said gear train for shifting the same into and out of engagement with said spool.

12. In a throw-off mechanism for fishing reels, the combination of a spool, a train of gears for rotating said spool, means for engaging and disengaging said train of gears from said spool comprising a reciprocating, oscillating shaft, a compression spring having a normal torsional bias connected with said shaft for oscillating the same upon its axis and for sliding the same in one direction in a line with its axis, and means for locking said shaft against oscillation in one of its extreme positions and means for locking said shaft against reciprocation in its other extreme position.

13. In a throw-off mechanism for fishing reels, the combination of a spool, a train of gears for rotating said spool, a spring actuated oscillating, reciprocating shaft, a shifting member connected with said shaft, manually operated means for reciprocating said shaft to cause said shifting member to effect an engagement of said gear train with said spool.

14. In a throw-off mechanism for fishing reels, the combination of a spool, a train of gears for rotating said spool, a reciprocating, oscillating shaft, a shifting member rigidly secured to said shaft, said shifting member having loose engagement with an element of said gear train, a double acting spring connected to said shifting member for oscillating said shaft in one direction and for reciprocating said shaft in one direction, and locking means for locking said shaft against oscillation at one extremity of its reciprocation and for locking said shaft against reciprocation at the other end of its throw.

15. In a throw-off mechanism for fishing reels, the combination of a spool, a train of gears for rotating said spool comprising a manually rotated driving gear and a driven pinion slidably mounted upon the spool spindle, clutch mechanism between said pinion and said spool, a manually actuated oscillating reciprocating shaft, a shifting member thereon for engaging said clutch mechanism whereby said gear train may be engaged with and disengaged from said spool.

16. In a throw-off mechanism for fishing reels, the combination of a spool and its spindle, a pinion slidably mounted upon said spindle, clutch mechanism between said spool and said pinion whereby said pinion may be engaged to said spool to rotate the same or disengaged therefrom to permit the spool to rotate independently of said pinion, a reciprocating, oscillating shaft, a shifting member rigidly connected to said shaft and engaging an element of said clutch mechanism, whereby the reciprocation of said shaft in one direction will engage said clutch mechanism with said spool, locking means for locking said clutch mechanism in engagement, manually operated means for releasing said locking mechanism, and automatic means for disengaging said clutch mechanism upon the release of said locking mechanism.

17. In a throw-off mechanism for fishing reels, the combination of a spool and its spindle, a pinion loosely mounted upon said spindle, said pinion having an extended hub, a clutch member upon the head of said spool and a mating clutch member rigidly secured to said hub, a collar loosely mounted upon said hub, a spring between said collar and the mating clutch member, a shifting member between said collar and the adjacent end of said pinion, a reciprocating, oscillating shaft rigidly connected with said shifting member, locking means for locking said shaft at one end of its throw against reciprocation and at the other end of its throw against oscillation, automatic means for sliding said shaft longitudinally upon the release of the corresponding locking mechanism, and manually operated means for sliding said shaft in the opposite direction whereby said clutch mechanism may be caused to engage said pinion with said spool to rotate the same and disengaged therefrom to permit said spool to rotate independently of said pinion.

PLINY CATUCCI.

In presence of—
 LOUIS M. SANDERS,
 NORMAN E. ZUSI.